(12) United States Patent
Ceotto et al.

(10) Patent No.: US 12,446,723 B2
(45) Date of Patent: Oct. 21, 2025

(54) MACHINE FOR BEVERAGE PREPARATION

(71) Applicant: CMA MACCHINE PER CAFFE' S.R.L., Susegana TV (IT)

(72) Inventors: Beppino Ceotto, Susegana (IT); Andrea Zonelli, Susegana (IT)

(*) Notice: Subject to any disclaimer, the term of this patent is extended or adjusted under 35 U.S.C. 154(b) by 795 days.

(21) Appl. No.: 17/296,596

(22) PCT Filed: Dec. 3, 2019

(86) PCT No.: PCT/IB2019/060391
§ 371 (c)(1),
(2) Date: May 25, 2021

(87) PCT Pub. No.: WO2020/115650
PCT Pub. Date: Jun. 11, 2020

(65) Prior Publication Data
US 2022/0022683 A1 Jan. 27, 2022

(30) Foreign Application Priority Data
Dec. 3, 2018 (EP) ..................................... 18209878

(51) Int. Cl.
A47J 31/36 (2006.01)
A23F 5/26 (2006.01)
(Continued)

(52) U.S. Cl.
CPC .............. *A47J 31/3671* (2013.01); *A23F 5/26* (2013.01); *A47J 31/0663* (2013.01);
(Continued)

(58) Field of Classification Search
CPC ..... A23F 5/26; A47J 2202/00; A47J 31/0663; A47J 31/3671; A47J 31/4467;
(Continued)

(56) References Cited

U.S. PATENT DOCUMENTS

2005/0193891 A1 9/2005 Garson et al.
2006/0254428 A1 11/2006 Glucksman et al.
(Continued)

FOREIGN PATENT DOCUMENTS

DE 196 29 239 1/1998
EP 2962606 A1 * 1/2016 .......... A47J 31/0663

OTHER PUBLICATIONS

International Search Report issued by the EPO on May 7, 2020 for International patent application No. PCT/IB2019/060391.
(Continued)

*Primary Examiner* — Steven W Crabb
*Assistant Examiner* — Dilnessa B Belay
(74) *Attorney, Agent, or Firm* — Themis Law

(57) ABSTRACT

The present invention concerns a machine (1) for preparing an infusion beverage, comprising: a machine body (10); a filter holder (2) removably constrained to the machine body (10), comprising a seat (2a) for at least one ingredient (100), preferably powdered, for a beverage preparation; a piston (3) constrained to the machine body (10); wherein said machine (1) comprises a motor (M, M') adapted to relatively move said filter holder (2) and said piston (3) between one another, so that to couple said piston (3) with said seat (2a) for, during use, defining an infusion chamber (6) and compressing said at least one ingredient (100) in said seat (2a).

13 Claims, 4 Drawing Sheets

(51) Int. Cl.
*A47J 31/06* (2006.01)
*A47J 31/44* (2006.01)
*A47J 31/52* (2006.01)

(52) U.S. Cl.
CPC ......... *A47J 31/4467* (2013.01); *A47J 31/525* (2018.08); *A47J 31/5251* (2018.08); *A47J 31/5253* (2018.08); *A47J 31/5255* (2018.08); *A47J 2202/00* (2013.01)

(58) Field of Classification Search
CPC .. A47J 31/525; A47J 31/5251; A47J 31/5253; A47J 31/5255
USPC .......................................................... 99/302
See application file for complete search history.

(56) References Cited

U.S. PATENT DOCUMENTS

| | | | |
|---|---|---|---|
| 2011/0281000 A1 | 11/2011 | Vergani et al. | |
| 2015/0250354 A1* | 9/2015 | Ceotto ................ | A47J 31/5255 99/281 |
| 2016/0366905 A1* | 12/2016 | Diester ................ | A47J 31/3671 |
| 2019/0254464 A1* | 8/2019 | Oddera .................. | G01G 13/29 |

OTHER PUBLICATIONS

Search Report issued by the EPO on May 22, 2019 for EP Priority application No. 18209878.0.

\* cited by examiner

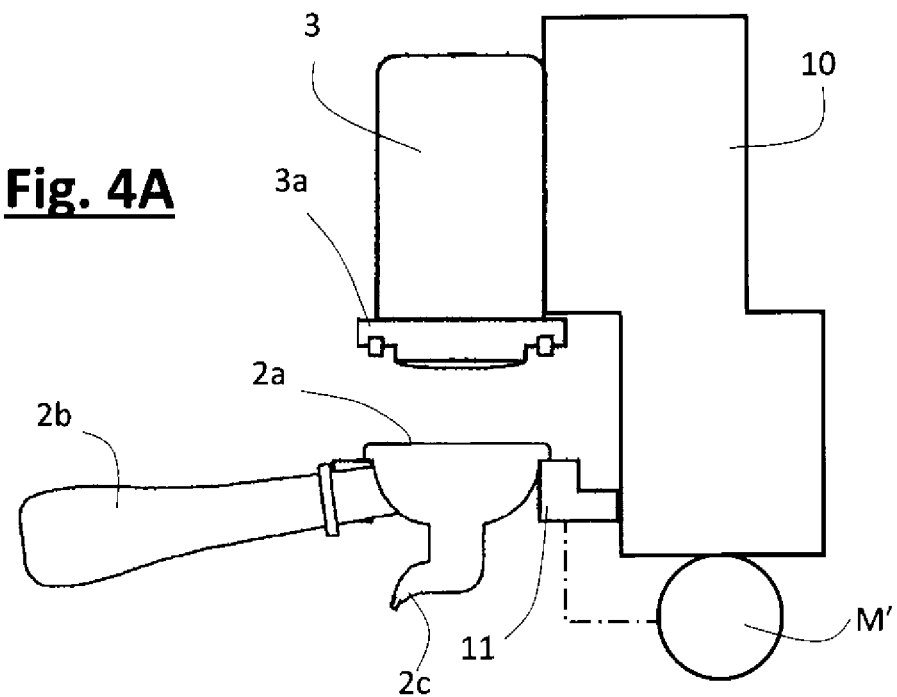
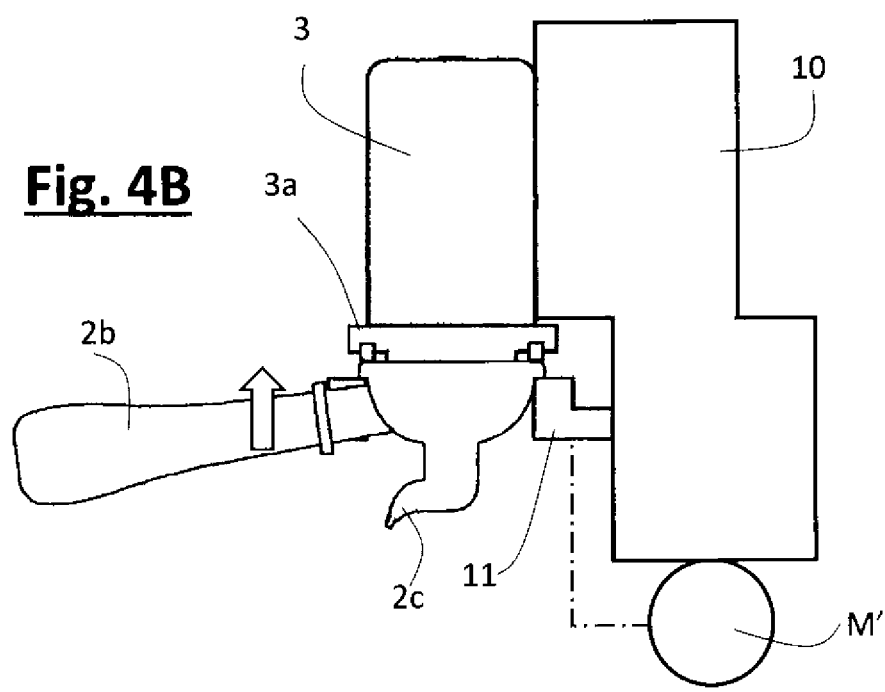

MACHINE FOR BEVERAGE PREPARATION

This application is a U.S. national stage of PCT/IB2019/060391 filed on 3 Dec. 2019 which claims priority to and the benefit of European Application no. 18209878.0 filed on 3 Dec. 2018 the contents of which are incorporated herein by reference in their entireties.

FIELD OF THE INVENTION

The present invention concerns a machine for infusion beverage preparations, typically coffee, and in particular machines provided with a filter holder removably couplable to the body of the machine.

KNOWN PRIOR ART

The professional coffee machines currently used for coffee preparations typically provide different manual operations. In particular, the operator manually fills the filter holder with powdered coffee. Successively, after having compressed the powdered coffee, the operator attaches the filter holder to the coffee machine, typically by inserting tabs in relative slots and by rotating the filter holder with respect to the machine.

These operations require a certain user ability, in particular to achieve well-compressed coffee. Considering the frequency of the operations carried out many times a day, for example by a barman, it is simple to understand how the quality of the coffee produced may not be constant over time.

Moreover, the ingredients for different beverages require different treatment and compression inside the filter holder, thus increasing the complexity of use for an operator.

SUMMARY OF THE INVENTION

Object of the present invention is therefore to provide a machine for preparing infusion beverages that allows to constantly obtain and maintain high quality infusion beverages over time.

A further object of the present invention is to provide a machine for preparing infusion beverages that allows to easily adapt to different types of beverages.

These and other objects are achieved by a machine, and by a relative method of use, according to one or more of the claims attached.

In particular, an aspect of the present invention concerns a machine according to claim 1, a relative method of use, and a data medium adapted to implement this method, according to the independent claims, while preferred aspects are stated in the dependent claims.

In particular, a machine for preparing infusion beverages according to the invention comprises: a machine body; a filter holder removably constrainable to the machine body; a piston constrained to the machine body. The machine body comprises a seat for at least one ingredient, preferably powdered, for preparing a beverage. The machine further comprises a motor adapted to relatively move the filter holder and piston between one another (i.e. to carry out a relative movement between the piston and filter holder), so that to couple the piston with the seat obtained in the filter holder, thus defining an infusion chamber, and so that to compress the ingredient.

The relative movement between the piston and filter holder therefore causes a predefined and repeatable compression of the ingredient, so that not to tire the operator of the machine and, more generally, to guarantee a constant quality of beverages in subsequent dispensing cycles.

According to an aspect of the invention, the machine comprises a control unit configured so that to receive from an operator, directly or indirectly, a desired pressure value to be applied to the ingredients, and to relatively move the piston and the filter holder between one another until the pressure value of the piston on the ingredients is reached. The term "pressure of the piston on the ingredients" refers to the compression performed on them.

The machine according to the present invention can therefore easily adapt itself to different types of beverages, e.g. espresso, American coffee etcetera. The operator selection was defined as direct or indirect, since the operator can directly select the pressure value (i.e. the numerical value) to be applied to the ingredients. In alternative, the operator could quantitatively specify the pressure to be applied to the ingredients, for example a "high" or "low" pressure. In addition, or alternatively, the operator selection indirectly involves a selection of the pressure to be applied to the ingredient. For example, the operator could select a type of beverage (for example strong black coffee) that is linked, in the machine, with a corresponding pressure value to be applied to the ingredient contained in the filter holder. The pressure, or compression, can also vary depending on the temperature of the water used for the infusion.

It should be noted that herein and hereunder, the definitions "pressure" and "force" to be applied to the ingredients are used alternatively. Actually, these definitions are substantially equivalent, since the difference between the two values is a constant multiplication factor given by the area of the section of the seat obtained in the filter holder. Determining the pressure value to be applied to the ingredient is therefore equivalent to determining the force value to be exerted on the ingredient and vice-versa.

According to an aspect, the control unit is configured so that to receive from an operator, directly or indirectly, a desired pressure value to be applied to the ingredients, and so that to transform the pressure value into an electric absorption value of the motor. The control unit therefore operates the motor to relatively move the piston and filter holder between one another until the mentioned electric absorption value is reached.

The control of the electric absorption of the motor allows to simply apply the pressure/force selected by an operator on the ingredients contained in the seat of the filter holder in order to compress them in the desired way.

According to an aspect, the control unit is configured to move the piston and the filter holder between one another as a function of, in addition to the desired pressure selected by an operator, environmental and infusion parameters. These environmental and infusion parameters preferably comprise at least one between:

the temperature outside of the machine; the humidity outside of the machine; the particle size of the at least one ingredient (for example expressed as function of the position of at least one millstone of the grinder); the pressure and/or flow rate of the infusion liquid in the hydraulic circuit of the machine, supplied to the infusion chamber.

These factors can in fact influence the quality of the final beverage, therefore it is possible to adjust the pressure of the at least one ingredient as a function of one or more of such parameters.

According to an aspect, the piston is movably constrainable with respect to the machine body.

According to an aspect, the filter holder is movably constrainable with respect to the machine body, in a direction moving away from and towards the piston. In particular, an aspect of the present invention provides that the filter holder is movably constrained with respect to the machine body, and in particular in a movable way along a direction away from or towards the piston, while the piston is integrally constrained to the machine body. This solution provides some advantages. In particular, the motor must move the filter holder (typically the housing of the machine body receiving the filter holder) and can be arranged at a distance from the piston. Typically at least the channels feeding the hot liquid to the infusion chamber are arranged at the piston, or the piston is anyhow often arranged at boiler or a similar element adapted to heat the liquid mentioned. The zone of the machine body adjacent to the piston therefore has, in use, a high temperature that is not advantageous for the operations of the motor. Moreover, the channels for the infusion liquid often go through the piston. This arrangement is made simple whenever the piston is not movable.

In an embodiment, both the piston and the filter holder are movable.

According to an aspect of the present invention, the machine has guides for the relative movement between the piston and filter holder. Typically, the relative movement between the filter holder and piston occurs in a substantially vertical direction.

According to an aspect of the present invention, the coupling between the machine body and filter holder provides a substantially rectilinear movement of the filter, and/or a rotation of the filter holder with respect to the machine body around a substantially vertical axis, considered in a condition of use.

The present invention further concerns a process for preparing an infusion beverage by means of an apparatus according to one or more of the aforesaid aspects, and comprises the steps of:
  i. receiving at least one ingredient in the filter holder;
  ii. coupling the filter holder with the machine body;
  iii. relatively moving the piston and filter holder between one another so that to couple the piston with the seat obtained in the filter holder, so that to define an infusion chamber and to compress the ingredient;
  iv. supplying a liquid in the infusion chamber to carry out an infusion;
  v. dispensing the beverage obtained by the infusion.

According to a particular aspect, before the cited step iii, the process comprises a step of receiving from an operator a pressure value to be applied to the ingredient and, during the step iii, the piston and/or filter holder are moved until such a pressure value is reached. As seen, the pressure value can be expressed by the operator also as a type of beverage (espresso, American coffee, etc.).

The present invention further concerns a non-temporary data support comprising instructions that, once read by a logic unit of a machine according to one or more of the preceding aspects, cause the machine to move the piston and filter holder between one another, so that to couple the piston with the seat obtained in the filter holder, and so that to compress the relevant ingredient, preferably until a pressure value selected by an operator is reached.

BRIEF DESCRIPTION OF THE DRAWINGS

With reference to the figures attached, exemplary and non-limiting embodiments of the present invention are now discussed, in which:

FIGS. 4A and 4B are schematic views of a machine according to an alternative embodiment with respect to the ones of the preceding figures, respectively with the filter holder lowered and raised with respect to the piston.

DETAILED DESCRIPTION OF EMBODIMENTS OF THE PRESENT INVENTION

Figure 1:
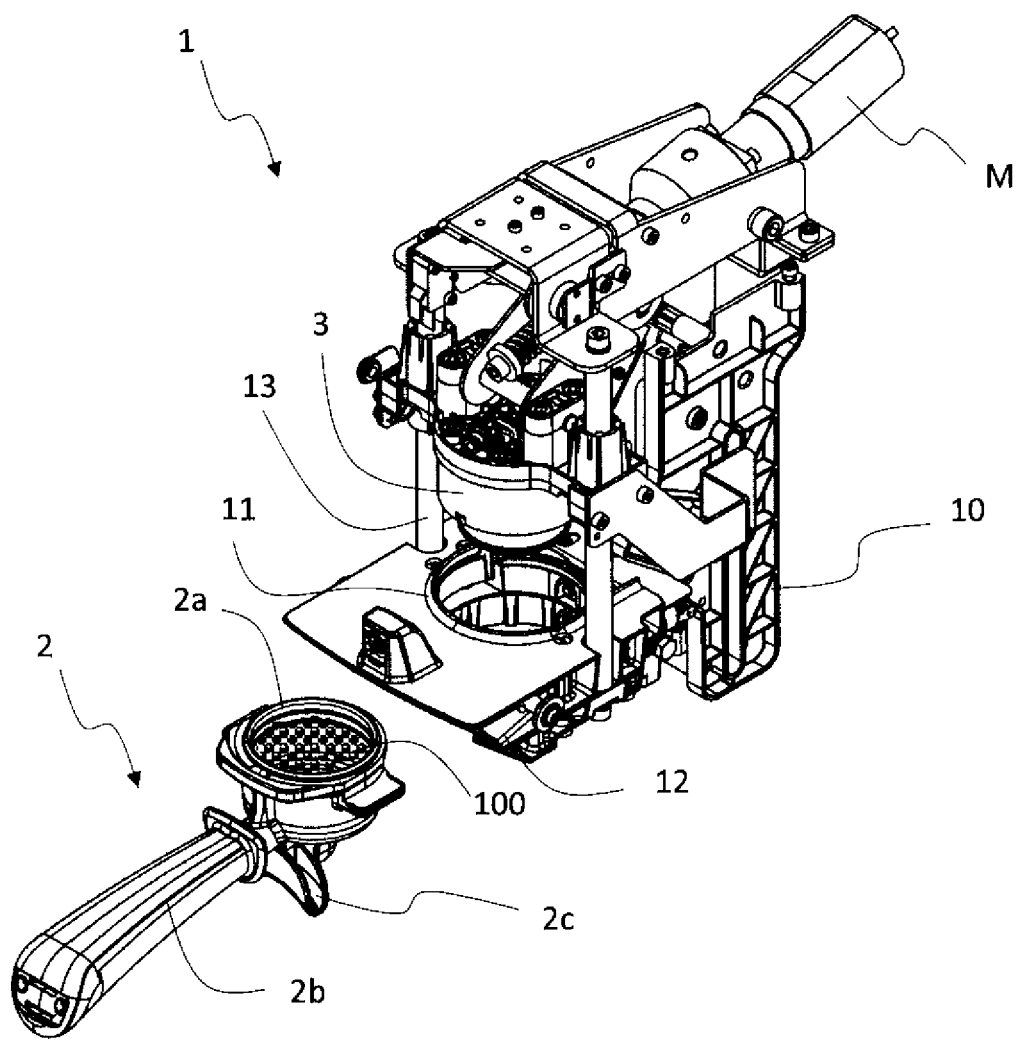
FIG. 1 is a perspective view of a machine according to an embodiment of the present invention, with the filter holder separated from the machine body.
Figure 2:
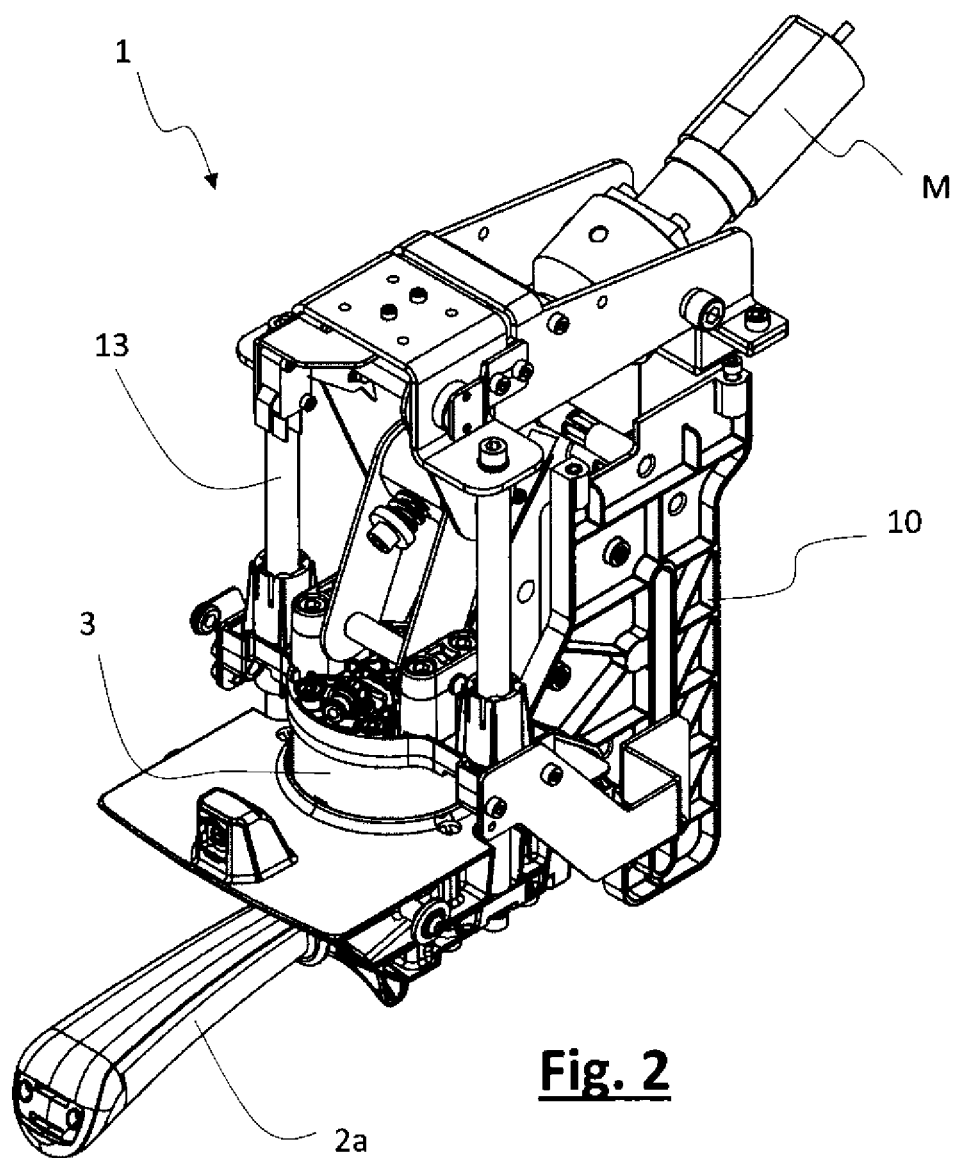
FIG. 2 is a perspective view of the machine of FIG. 1, with the filter holder constrained to the machine body and the piston lowered.

With reference to the attached figures, a machine 1 for preparing beverages comprises a machine body 10, which constitutes the main structure of the machine 1. The machine body 1 comprises, or can be connected with, devices for preparing an infusion beverage, and in particular with elements for heating and providing a liquid under pressure, typically water, to an infusion chamber 6 (better discussed hereunder). These devices, known in the art and not discussed in detail herein, can for example comprise a boiler (or kettle), a pump, a channels system, valves, etc.

The machine 1 further comprises a filter holder 2 removably constrainable to the machine body 10. The filter holder 2 comprises a seat 2a for containing one or more ingredients 100 for preparing an infusion beverage. Typically, such an at least one ingredient 100 is a powdered ingredient, for example powdered coffee. For descriptive convenience, it will be generically referred to as an "ingredient" 100 henceforth. The following description is also applicable whenever more types of ingredients 100 are arranged inside the seat 2a of the filter holder 2.

The seat 2a is typically bowl-shaped, i.e. has a substantially circular section, has a closed bottom and an open top portion; in other words, the top portion of the seat has an opening. The seat 2a is generally constrained at an end of an handle 2b having an elongated shape, and adapted to be held by an operator.

The filter holder 2 further has one or more outlets 2c, in fluidic communication with the seat 2a, adapted to allow the dispensing of a beverage from the seat 2a towards an outer container. A filter, known in the art and not shown in detail, is inserted inside the filter holder 2, so that to keep the ingredient inside the seat 2a, i.e. so that to prevent the ingredient 100 from coming out through the outlet 2c.

The filter holder 2 is typically constrained to a housing 11 of the machine body 10. The housing 11 is configured so that to allow to removably constrain the filter holder 2 to the housing 11 itself. As known, the filter holder 2 is in fact constrained to the machine body 10 during the preparation steps of a beverage (at least during the infusion), while it can be released from it in previous and/or subsequent steps. For example, the filter holder 2 can be coupled with an external device adapted to provide a ground ingredient 100 in the seat 2a; the filter holder 2 can be removed from the machine body 10 at the end of the infusion, so that to remove the exhausted ingredient from the seat 2a.

According to a possible embodiment, the machine body 10 comprises guides 12 adapted to allow the coupling of the filter holder 2 with the machine body along a rectilinear direction. The machine body 10 typically has a longitudinal axis A. The rectilinear insertion direction of the filter holder 2 is typically perpendicular to the longitudinal axis A of the machine body 10, or is anyhow a substantially horizontal direction, considering the orientation of the machine 1 in a condition of use.

According to a possible alternative, the guides 12 could allow, in a known way, a relative rotation between the machine body 10 and the filter holder 2, so that to selectively allow to constrain and release the filter holder 2 and the machine body 10, for example by a bayonet coupling. The relative rotation between the machine body 10 and the filter holder 2 typically occurs around an axis parallel to the longitudinal axis A, or around an axis that, in a condition of use, is substantially vertical.

The machine 1 further comprises a piston 3. The piston 3 typically comprises a head 3*a* having size substantially equal to that of the seat 2*a*, and in particular to the upper portion of the seat 2*a* of the filter holder 2, i.e. of the opening of the seat 2*a*. The piston 3 is preferably provided with gaskets 3*b* arranged on the head 3*a*, so that to guarantee the fluidic seal when the piston 3 couples with the seat 2*a*, so that to obtain, as better discussed hereunder, an infusion chamber 6.

Figure 3A:
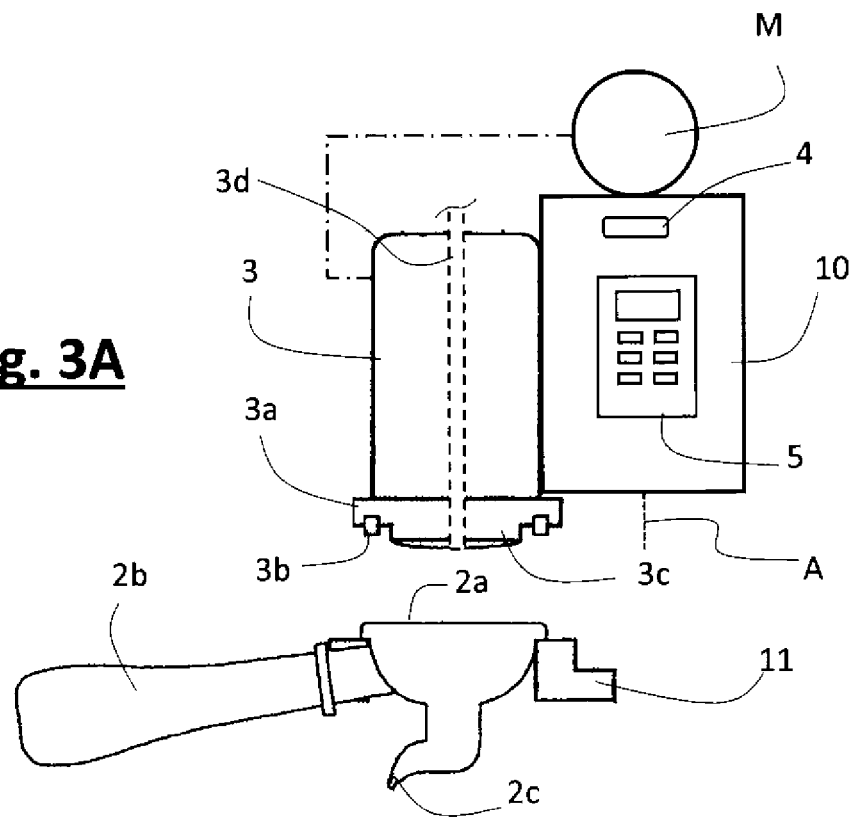
FIGS. 3A and 3B are schematic views of a machine according to an embodiment similar to that of FIG. 1, respectively with the piston raised and lowered with respect to the filter holder.
Figure 3B:
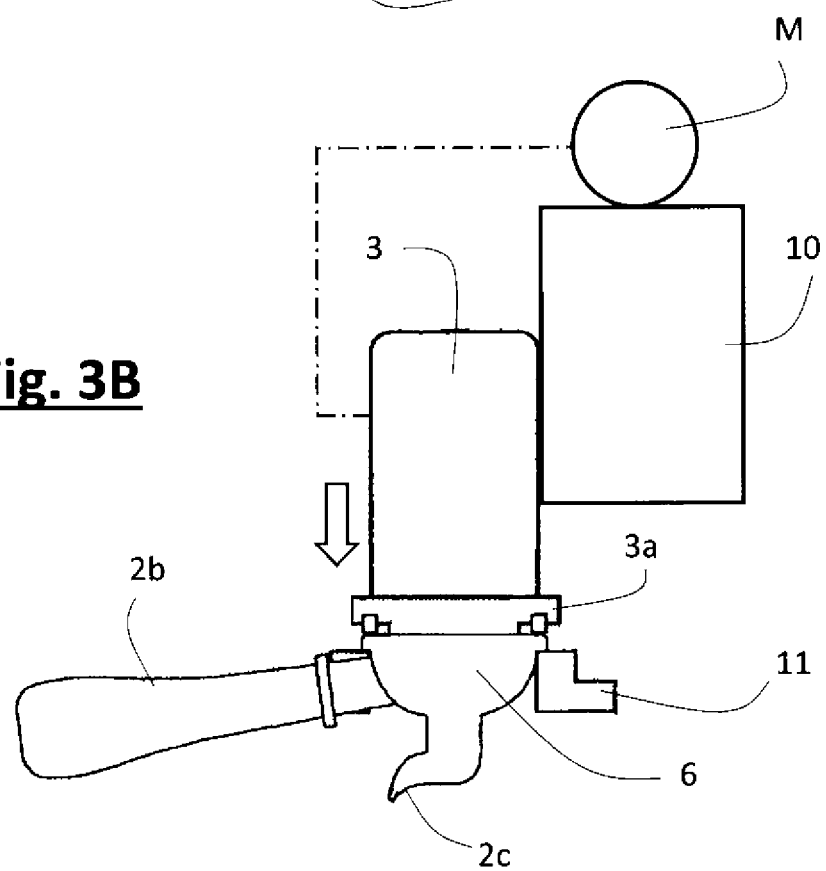

As known, in order to carry out an infusion, an infusion liquid is supplied under pressure to an infusion chamber containing ingredients, typically powdered ingredients. According to a preferred aspect, the piston 3 comprises one or more channels 3*d* (schematically shown in FIG. 3A only), which go through at least part of the piston 3 and which, once the piston 3 is coupled with the seat 2*a* of the filter holder 2, are in fluidic communication with the seat 2*a*, i.e. with the infusion chamber 6 formed by the seat 2*a* and by the head 3*a* of the piston 3.

The machine 1 is provided with a motor M, M' adapted to relatively move the piston 3 and the filter holder 2 between one another. This relative movement can be carried out by moving the piston 3 only, the filter holder 2 only, or both the elements (in which case more than one motor M, M' can possibly be present).

In the embodiment of FIGS. 1-3B, a motor M moves the piston 3, while the filter holder 2 is not movable towards or away from the piston 3 (generally, the only possible movement for the filter holder 2 with respect to the machine body 10 is the one that selectively allows to constrain or release the filter holder 2 to/from the machine body 10).

Various types of motors M can be used to move the piston 3. According to a preferred solution, the motor M is an electric motor constrained to the piston 3 by a toggle 14. The machine body 10 further preferably has guides 13 for the piston 3 for guiding the movement of the piston 3 with respect to the machine body 10. According to a possible solution shown in the figures, the piston 3 is slidingly constrained to two guides 13 arranged on the sides of the machine body 10.

An alternative embodiment is schematically shown in FIGS. 4A and 4B, in which the piston 3 is integral with the machine body 10 and in which the filter holder 2, thanks to a motor M', is movable in a direction towards and away from the piston 3 with respect to the machine body 10. Preferably, the motor M' is constrained to the housing 11, so that to move it with respect to the machine body 10. Therefore, when the filter holder 2 is constrained to the housing 11, the movement of the housing 11 also causes the movement of the filter holder 2. The connection between the motor M' and the filter holder 2 can occur in different ways. For example, it is possible to use a toggle also for this solution. Other solutions are anyhow possible, for example in a possible alternative embodiment, the motor M' causes the rotation of a screw, which couples with a relative nut screw in the housing 11.

Therefore, generally (at least) one motor M, M' of the machine 10 causes the relative movement between the piston 3 and the filter holder 2. This movement occurs at least between two positions. In a first position (shown in FIGS. 1, 3A and 4A), the piston 3 is not coupled to the filter holder 2 and in particular from the seat 2*a*, i.e. is arranged at a distance from the filter holder 2. In a second position (shown in FIGS. 2, 3B and 4B), the piston 3 is instead coupled with the filter holder 2, so that to close the seat 2*a* and so that to guarantee the fluidic sealing thereof. As previously mentioned, an infusion chamber 6 is formed in this condition, formed by the walls of the seat 2*a* and by the piston 3, in particular by the head 3*a* of the piston 3. The relative movement between the filter holder 2 and the piston 3 preferably occurs in a direction substantially parallel to the longitudinal axis A of the machine body 10.

Considering the condition of use, the relative movement between the piston 3 and the filter holder 2 typically occurs along a substantially vertical direction. In a preferred embodiment, the piston and the filter holder are coaxial; this implementation can be applied in all variants described herein.

The head 3*a* of the piston 3 is typically non-flat, but has a protruding portion 3*c*. The protruding portion 3*c* has a substantially complementary shape with respect to the seat 2*a*. In fact, in a condition of use, the protruding portion 3*c*, when the piston 3 and the filter holder 2 are coupled, i.e. when they are in the previously discussed second position, is typically (at least partially) inserted into the seat 2*a*, so that to compress the ingredient 100 arranged inside the seat 2*a*.

According to an aspect of the invention, the machine 1 comprises a control unit 4 adapted to control at least the operations of the motor M. Typically, the control unit 4 is configured to control various operations of the machine 1. In particular, a preferred aspect of the invention provides that the second relative position between the piston 3 and the filter holder 2 can change in different beverage dispensing operations. In the various types of second positions, the piston 3 and the filter holder 2 are coupled so that to guarantee the fluidic seal of the infusion chamber 6. However, the relative position between the piston 3 and filter holder 2 can be slightly changed in different dispensing operations of a beverage, so that the piston applies a different pressure to the ingredient 100 in different dispensing operations.

In particular, the control unit 4 can drive the motor M so that the piston 3 applies a different pressure on the ingredients 100 in different dispensing operations, as a function of different variables. Preferably, the control unit 4 drives the motor M and therefore the compression of the ingredients, as a function of the operator selection. The machine 1 is in fact typically provided with an interface 5 that allows the operator to send data or commands to the control unit 4.

One of the commands that the control unit 4 can receive is the selection of a desired pressure value to be applied to the ingredients, i.e. a pressure/force that the operator wishes to apply to the ingredients 100 via the piston 3. The "pressure value" can assume different forms. It should be noted that herein and hereunder, the definitions "pressure" and "force" to be applied to the ingredients will be used alternatively. For example, according to a first embodiment, an operator can provide to the control unit 4 a desired pressure (or force) value to be applied to the ingredient 100.

This value can be selected directly, for example it can be a numerical value or also a quantitative indication of the desired force/pressure (for example "high," "standard," or "low"). These approximate indications are combined in the machine 1 with specific pressure values. In addition, or alternatively, the pressure value can be indirectly selected by the operator. For example, the operator can select the type of desired beverage (for example "espresso coffee" or "American coffee"), which is linked in the machine 1 to a predefined pressure/force value that the piston 3 must apply to the ingredient 100 in the seat 2*a*.

In embodiments of the present invention, the interface 5 shows the trend of the pressure exerted by the piston 3 on the ingredient 100, typically by means of a curve in a relative graph. The trend of the pressure can be shown during a beverage preparation, so that to allow an operator to check the operations of the machine 1; in addition or alternatively, the interface 5 can show different possible pressure trends so that to allow an operator to select the one desired for the beverage preparation. In other words, according to a possible aspect, the interface 5 shows some possible different pressure trends that the piston 3 can apply to the ingredient 100, so that to allow the operator to select the desired pressure value.

According to a further aspect, the control unit 4 can control the motor M as a function of further environmental or infusion parameters, in addition to the operator selection.

Different factors can in fact influence the infusion of a beverage. For example, the machine 1 can be provided with sensors to evaluate the humidity in the air, or to receive such data from an operator or from another external source. Moreover, the machine 1 can be provided with sensors to evaluate the air temperature, or to receive such data from an operator or from another external source.

In addition or alternatively, the machine 1 can detect (or receive as an input) the particle size of the ingredient 100, for example from the grinder that carries out the grinding outside of the machine. The particle size of the ingredient can for example be detected or received as an input from the machine directly with one or more particle size data of the ingredient, or indirectly. The term "indirectly" means that the particle size of the ingredient can be for example detected or received by the machine with one or more data indicative of the position of the millstone (or of the relative position of two or more millstones) of the grinding device (or grinder) in which the powdered ingredient is prepared. It should be noted that, according to possible embodiments, the grinder can be outside of the machine object of the present invention, or can be integrated in the machine object of the present invention.

In addition or in alternative to the environmental and operating parameters discussed above, the pressure and/or flow rate of the liquid in the hydraulic circuit of the machine that is supplied to an infusion chamber 6, for example formed by the piston 3 and by the filter holder 2 (for example as discussed above), can be used.

With regard to this it should be noted that, according to a possible aspect, the machine 1 can comprise a flowmeter (and in general a flow rate sensor) not shown in the accompanying figures and adapted to directly or indirectly measure the amount of liquid supplied to the infusion chamber 6, for example formed by the filter holder 2 and the piston 3. In addition or in alternative, according to an aspect, the machine can comprise a pressure sensor (not shown in the accompanying figures) adapted to directly or indirectly determine the pressure of the liquid that is supplied to the infusion chamber 6, for example formed by the filter holder 2 and the piston 3 and, in general, the pressure in the hydraulic circuit, preferably between the pump and the filter holder.

As mentioned above, the flow rate sensor and/or the pressure sensor are connected to the control unit 4 and are able to generate, respectively, a flow rate and pressure measurement signal, such values can be displayed on the interface 5, for example on a display.

In detail, according to an aspect, the possibility to detect, during the delivery, the pressure and/or flow rate values in the hydraulic circuit and to generate a plurality of pressure and/or flow rate profiles indicative of the respective values during the delivery, is provided. In other words, the flow rate and/or pressure trend of a delivery during the delivery itself can practically be displayed in real time on the interface 5.

As already mentioned, the profiles or values detected are preferably used to control the pressure exerted by the piston 3 on the ingredient 100.

For example, as discussed above, in addition to the selection of the pressure exerted by the piston by an operator, the detected pressure and/or flow rate profiles or values of the infusion liquid can be used to correct the pressure value that the piston 3 exerts on the ingredient 100. The control unit 4 can therefore control the motor M as a function the operator selection and on one or more environmental or infusion parameters For example, the control unit 4 can link a pressure/force value that the piston must apply to the ingredient 100 to each possible operator selection, and correction factors that are a function of environmental or infusion parameters to determine how to operate the motor M. For example, the control unit can receive an input selection from an operator corresponding to a pressure of 3 bars that the piston 3 must apply to the ingredient 100. Such value can be, for example, corrected to 3.15 bars once the control unit 4 has received/verified temperature and humidity outside of the machine 1.

In addition or in alternative, according to a possible embodiment, the control unit 4 can associate a pressure/force value that the piston 3 must apply to the ingredient 100 for each possible selection of an operator, possibly corrected by means of corrective factors which are a function of on the environmental or infusion parameters.

For example, as discussed above, the corrective factor can be calculated depending on a variation of the pressure and/or flow rate values measured (for example by means of the respective sensor) with respect to the predetermined pressure and/or flow rate profiles (for example stored in the control unit 4), for example associated with a delivery program relating to a beverage.

The machine 1, and in particular the control unit 4, analyses the trend of the flow rate and/or pressure by checking if the trend respects the preset parameters, i.e. if it follows a predefined profile and, for example, if the value varies, for example, from the predefined value, possibly by taking into account a preset tolerance value (below or above the predefined profile).

If the actual trend of the pressure (for example, if during the delivery, at least one measured value) exceeds the predefined maximum value, the machine 1, through the control unit 4, corrects the pressure that the piston exerts on the ingredient 100, for example to decrease the pressure exerted by the piston 3 on the ingredient 100.

If the actual trend of the pressure (for example, if during the delivery, at least one measured value) exceeds the predefined minimum value and is thus below it, the machine 1, through the control unit 4, corrects the pressure 3 that the piston exerts on the ingredient 100, for example to increase the pressure exerted by the piston 3 on the ingredient 100.

As mentioned, in combination with or in alternative to the pressure evaluation, the evaluation can be carried out on the flow (flow rate of the infusion fluid).

If the actual trend of the flow rate (for example, if during the delivery, at least one measured value) exceeds the predefined maximum value, the machine 1, through the control unit 4, corrects the pressure 3 that the piston exerts on the ingredient 100, for example to increase the pressure exerted by the piston 3 on the ingredient. If the actual trend of the flow rate (for example, if during the delivery, at least one measured value) exceeds the predefined minimum value, the machine 1, through the control unit, corrects the pressure 3 that the piston exerts on the ingredient 100, for example to decrease the pressure exerted by the piston 3 on the ingredient 100.

It should be noted that, according to an aspect, the execution of the operations for correcting the pressure exerted by the piston 3 on the ingredient 100 according to one or more environmental or operating parameters (such as for example the one carried out by monitoring the delivery flow rate and/or pressure with respect to a predetermined profile) can be carried out so that the control unit 4 corrects (i.e. changes the pressure value, predefined or set by the operator, that the piston will exert on the ingredient) only after the error, with respect to the predetermined profile (and in general to the variation of the environmental or operating parameters with respect to a predefined value or profile), has been repeated for a preset number of times, for example for 5 deliveries for which the operator had set or selected the same pressure value of the piston 3 on the ingredient 100.

Such number of times during which the error must be repeated can be for example selected by the user and can be equal to a number less than or above five, for example, 2 times, 3 times, 4 times, or even 6 times, 7 times or 8 times.

The control unit 4 can control the pressure applied by the piston 3 to the ingredient 100 in different ways. A preferred embodiment, shown in the figures, controls the pressure absorption of the motor M, M' during the relative movement between the piston 3 and filter holder 2. In particular, the control unit 4 can be programmed to operate the motor M, M' so that to bring the piston 3 and the filter holder 2 closer to one another, until the electric absorption of the motor M, M' reaches a certain threshold value. Moreover, the control unit 4 can link the different possible pressures/forces applicable to an ingredient 100 to corresponding electric absorption threshold values of the motor M, M'. For example, a pressure of 3 bars can be linked to an absorption of 2 Amperes (hypothesizing a constant voltage supply value), while a pressure of 5 bars can be combined with an absorption of 3.5 Amperes (the numbers are indicative only and do not necessarily reflect a real condition). Therefore, if the operator selection and possibly some additional environmental or infusion parameters determine that the desired pressure is equal to 3 bars, with reference to the exemplary values mentioned above, the control unit operates the motor M, M' by bringing the piston 3 and the filter holder 2 closer to one another until the electric absorption of the motor M, M' reaches 2 Amperes. Once this value has been reached, the relative approaching movement between the piston 3 and filter holder 2 is interrupted. Similarly, if the desired pressure is equal to 5 bars, the control unit 4 operates the motor M, M' to bring the piston 3 and the filter holder 2 closer until the relative electric absorption reaches 3.5 Amperes.

The electric absorption is not the only way to control the motor M, M'. For example, the pressure/force values can be linked to the relative displacement between the piston 3 and the filter holder 2, e.g. feedback controlled by means of a suitable sensor, or controlled via an open loop by using a stepper motor.

In use, the filter holder 2 is filled with an ingredient 100 for preparing an infusion beverage. For example, the ingredient 100 can be poured directly by the operator inside the filter holder 2, or the filter holder 2 can be constrained to an external device (for example a grinder) adapted to supply an ingredient 100 to the filter holder 2.

The filter holder 2 is therefore constrained to the machine body 10. With reference to the previously described embodiment, the filter holder 2 is constrained to the housing 11 of the machine body 10. The possibility to arrange an ingredient 100 in the filter holder 2 after having constrained the filter holder 2 to the machine body 10 is not excluded. Generally, during this step, the filter holder 2 and the piston 3 are not constrained to one another.

The machine 1 therefore receives a command to prepare and dispense a beverage. The motor M, M' is therefore operated so that to bring the filter holder 2 and the piston 3 closer to one another, until coupling the two elements so that to define an infusion chamber 6. In particular, in this step, the piston 3 closes the seat 2a of the filter holder 2 and compresses the ingredient 100 contained therein.

Preferably, the compression of the ingredient 100 is a function of the operator selection, i.e. of the pressure/force the operator wishes to apply to the ingredient 100. In particular, the control unit 4 of the machine 1 receives the input selection of the operator and, as a function of that, determines which force/pressure must be applied to the ingredient 100. As discussed above, other environmental and/or infusion parameters can also affect the determination of the force/pressure to be applied to the ingredient 100, such as, for example, the outside humidity and/or temperature, particle size of the ingredient 100, etc.

Once the pressure value to be applied to the ingredient 100 has been determined, the control unit 4 operates the motor M, M' until such a pressure value is reached. Preferably, as discussed above, the control unit determines the pressure value to be applied to the ingredient 100 as an electric absorption value of the motor M, M', and operates the motor M, M' so that to bring the piston 3 and the filter holder 2 closer to one another until such an electric absorption value is reached.

Then, the infusion of the beverage occurs in a known way. Liquid, typically heated and under pressure, is supplied to the infusion chamber 6, for example through the piston 3. The beverage formed in this way is therefore dispensed by the machine, typically through the outlet 2c of the filter holder 2.

The invention claimed is:

1. A machine for preparing an infusion beverage, comprising:
   a machine body;
   a filter holder removably constrained to the machine body, said filter holder comprising a seat for at least one ingredient for preparing a beverage;
   a piston constrained to the machine body;
   a motor adapted to relatively move said filter holder and said piston between one another, so that to couple said piston with said seat for, during use, defining an infusion chamber and compressing said at least one ingredient in said seat;
   a controller configured to receive from an operator, directly or indirectly, a desired pressure value to be applied to said at least one ingredient, and to relatively move said piston and said filter holder between one another until said pressure value is reached; and an interface that enables the operator to send data or commands to the controller, wherein the interface is configured to display a trend of a pressure exerted by the piston on the at least one ingredient, wherein said controller is configured to move said piston and said filter holder between one another depending on, in addition to the desired pressure value received from the operator, a pressure value and/or a flow rate of an infusion liquid supplied to said infusion chamber, and wherein said controller is further configured to move said piston and said filter holder between one another after a deviation of said pressure value and/or said flow rate of said infusion liquid exceeds a tolerance range for a predetermined plurality of times.

2. The machine according to claim 1, wherein said controller is further configured to transform said pressure value into an electric absorption value of said motor, and to operate said motor in order to relatively move said piston and said filter holder between one another until said electric absorption value is reached.

3. The machine according to claim 1, wherein the piston is movably constrained with respect to the machine body.

4. The machine according to claim 1, wherein said filter holder is movably constrainable with respect to the machine body, in a direction away from or towards said piston.

5. The machine according to claim 1, further comprising guides for a relative movement between said piston and said filter holder.

6. The machine according to claim 5, wherein the machine configured so that, in use, the relative movement between said filter holder and said piston occurs in a vertical direction.

7. The machine according to claim 1, wherein the machine is configured so that a coupling between the machine body and said filter holder provides a rectilinear movement of the filter holder, and/or a rotation of the filter holder with respect to the machine body around a vertical axis, considered in a condition of use.

8. The machine according to claim 1, wherein said at least one ingredient is powdered.

9. The machine according to claim 1, wherein the interface is configured to display the trend of the pressure is displayed in curve or graph form.

10. The machine according to claim 1, wherein the interface is further configured to display possible pressure trends, so as to enable the operator to select a pressure trend for preparing the infusion beverage.

11. The machine according to claim 1, wherein said controller is further configured to move said piston and said filter holder between one another depending on, in addition to the desired pressure received from the operator, environmental or infusion parameters, said environmental or infusion parameters comprising at least one of:

temperature outside of the machine, or humidity outside of the machine.

12. The machine according to claim 1, wherein said piston has a head with a protruding portion configured to penetrate into said seat of said filter holder so as to compress said at least one ingredient is said seat, and further has an edge portion configured to overlap an upper edge of a wall of said seat.

13. The machine according to claim 12, further comprising a gasket interposed between said edge portion of said piston and said edge of said seat.

* * * * *